United States Patent [19]

Okamoto

[11] Patent Number: 4,978,875
[45] Date of Patent: Dec. 18, 1990

[54] DRAINING DEVICE FOR A STARTER

[75] Inventor: Kyoichi Okamoto, Himeji, Japan

[73] Assignee: Mitsubishi Denki Kabushiki Kaisha, Tokyo, Japan

[21] Appl. No.: 427,222

[22] Filed: Oct. 24, 1989

[30] Foreign Application Priority Data

Nov. 26, 1988 [JP] Japan .................. 63-154021[U]

[51] Int. Cl.⁵ .............................................. H02K 5/22
[52] U.S. Cl. ........................................ 310/88; 310/43; 310/89
[58] Field of Search ............................ 310/43, 88, 89

[56] References Cited

U.S. PATENT DOCUMENTS 4,808,871 2/1989 Morishita et al. ................ 310/89

FOREIGN PATENT DOCUMENTS 622906 2/1984 Japan .................................... 310/89
110930 10/1988 Japan .
162963 11/1988 Japan .

Primary Examiner—Steven L. Stephan
Assistant Examiner—D. L. Rebsch
Attorney, Agent, or Firm—Sughrue, Mion, Zinn, Macpeak and Seas

[57] ABSTRACT

A water draining device 18 for a starter motor, adapted to be attached to the starter casing or bracket 4, has a tubular body 18b whose inner circumferential surface is of labyrinth structure and which is made of an elastic material. A root portion 18c of the tubular body is thinner and more deformable than the rest of the tubular body such that it bends upon external water impact to prevent invasion thereof.

6 Claims, 3 Drawing Sheets

FIGURE 1a   FIGURE 1b
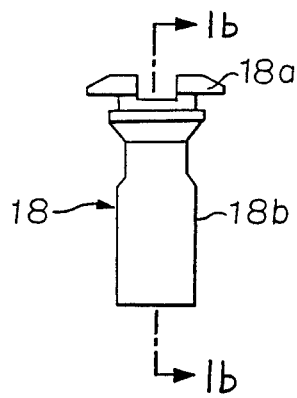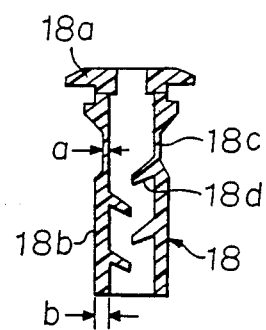
FIGURE 2
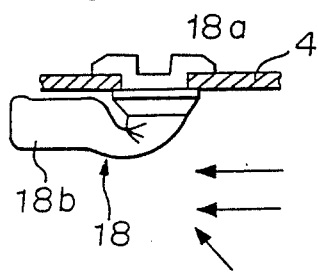
FIGURE 3a   FIGURE 3b
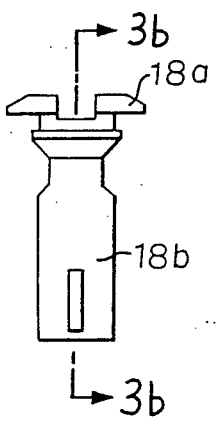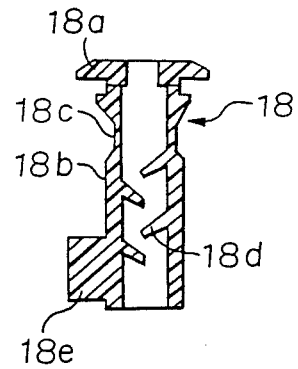

DRAINING DEVICE FOR A STARTER

BACKGROUND OF THE INVENTION

1. Field of the Invention

The present invention relates to a draining device for a starter, which is used to drain the water which has invaded in the starter.

2. Discussion of Background

FIG. 4 is an axial sectional view showing the entire structure of a starter having a starter draining device. In FIG. 4, reference numeral 1 designates an electric motor armature. Reference numeral 2 designates a yoke constituting a casing for the starter, and on the inner circumferential surface of which field coils 3 are arranged. With the rear end of the yoke 2 is engaged a rear bracket (rear part of the casing) 4, which has its rear end provided with a bearing 5. The rotary shaft 6 of the armature is supported at its rear end by the bearing 5. To the rear bracket 4 is fixed a brush device 8 which is in sliding contact with the commutator 7 of the armature 1. At the front side of the armature 1 a pinion 10 is arranged through an overrunning clutch 9. The pinion 10 and the overrunning clutch 9 are carried on the armature rotary shaft 6 so as to be movable in the axial direction. Reference numeral 11 designates a front bracket (front part of the casing) which is engaged with the front end of the yoke 2. The armature rotary shaft 6 is supported at its front end by the front bracket 11 through a bearing 12. To the front bracket 11 is integrally fixed a solenoid switch device 13, having a casing 14. Lever 15 has one end engaged with a plunger 16 of the solenoid switch device 13, and its other end engaged with the rear end of the overrunning clutch 9, and which is arranged so as to be swingable about its fulcrum.

Reference numeral 17 designates a tubular draining member which is engaged with a lower portion of the rear bracket 4 and is made of rubber, and which has the structure shown in FIG. 5. Specifically, the draining member 17 is integrally provided with an engaging portion 17a and a tubular body 17b, the draining member being engaged with the rear bracket at the engaging portion. The tubular body 17b has on its inner circumferential surface a plurality of lips 17c which are directed toward the leading end of the tubular body or the direction perpendicular to the inner circumferential surface, facing each other. Such lips are alternately formed to define a baffle labyrinth structure.

In the starter constructued in this way, the solenoid switch device 13 is actuated to let the armature 1 rotate and the pinion 10 move in the forward direction. As a result, the pinion is brought into mesh with a ring gear to start the engine. Because such operation is well known, detailed description on it is omitted.

In the draining device of the conventional starter, the draining member 17 drains the water which has invaded the inside of the starter, and also prevents water splashed from below from coming into the inside of the starter by virture of the tubular structure and the labyrinth structure in the tubular body.

However, when a high water pressure is applied to the draining member 17 as in the case of, e.g. water splashed by a wheel, or water sprayed by a high pressure car wash device, the water invades the inside of the starter from the leading end of the draining member 17 in some cases. Such cases create a problem wherein the brush device 8 rusts away to prevent the motor from functioning properly.

In order to solve such problem, it could be thought out that the length of the tubular body 17b is sufficiently extended to prevent the water from invading the inside of the starter. Such solution is difficult to be adopted because the space for mountaining the starter to a vehicle is, in general, limited, which means that the length of the draining member 17 is also limited.

SUMMARY OF THE INVENTION

It is an object of the present invention to solve the problem, and to provide a draining device for a starter capable of preventing water from invading the inside of the starter through the draining device even if a high pressure water is splashed on the draining device.

The foregoing and other objects of the present invention have been attained by providing a draining device for a starter comprising a tubular body, and a portion of the tubular body at a predetermined position which is more deformable than portions of the tubular body at any other position. As a result, when a high pressure water is splashed on the draining member, the draining member can be easily deformed at the predetermined position by the water pressure, thereby to prevent the water from invading from the leading edge of the draining member into the inside of the starter without extending the length of the draining member in an excess of size.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1a and 1b are, respectively, a front view and a sectional view taken along the line 1b—1b FIG. 1a of an embodiment of the draining member according to the present invention;

FIG. 2 is a front view showing the state wherein the draining member attached to the starter casing has received water pressure;

FIGS. 3a and 3b are, respectively, a front view and a sectional view taken along the line 3b—3b of FIG. 3a of another embodiment of the draining member according to the present invention;

DESCRIPTION OF PREFERRED EMBODIMENTS

Preferred embodiments of the present invention will be described in detail with reference to the accompanying drawings.

Figure 4:
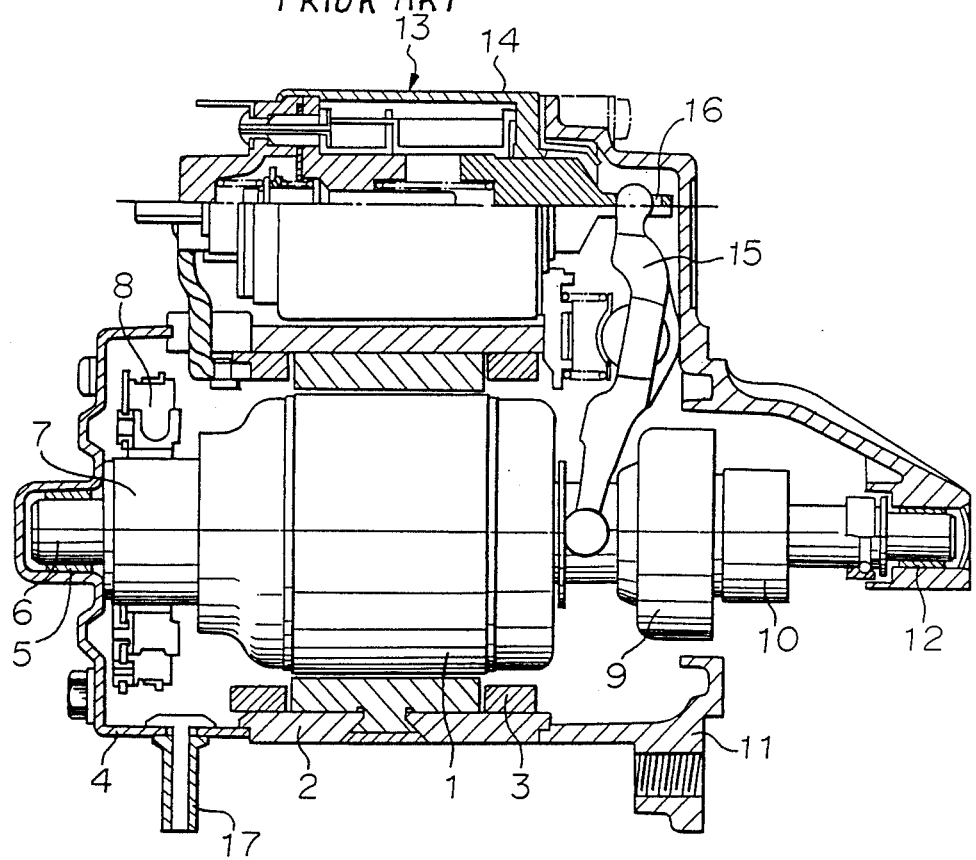
FIG. 4 is an axial sectional view of a starter with a conventional starter draining device applied.
Figure 5B:
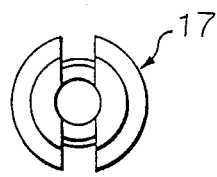
FIGS. 5a, 5b and 5c are, respectively, a front view, a plan view and a sectional view taken along the line 5c—5c of FIG. 5a of the draining member in the conventional starter draining device.
Figure 5A:
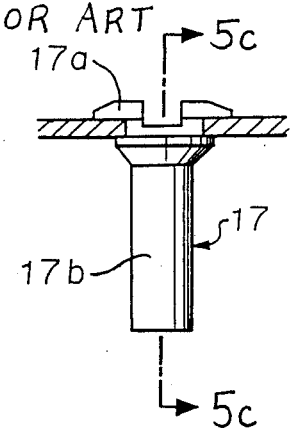
Figure 5C:
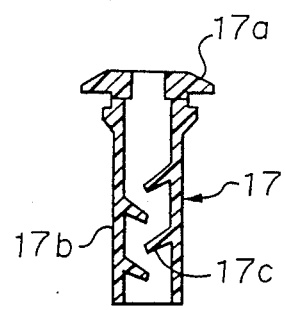

FIG. 1a is a front view showing a draining member 18 of a starter draining device of an embodiment according to the present invention. The draining member 18 comprises an engaging portion 18a similar to the conventional one shown in FIG. 5a, and a tubular body 18b. The tubular body 18b includes a thin-wall portion 18c at its root, whose wall thickness a is less than the wall thickness b of the portion near to the leading end of the tubular body in comparison with the root. The engaging portion 18a and the tubular body 18b are integrally made, preferably, of rubber. The length of the tubular body 18b can be the same as the conventional one. The tubular body has on its inner circumferential surface a labyrinth structure with a plurality of lips 18d like the conventional one.

When high pressure car wash water or splashed water is applied, like water pressure indicated by arrows of FIG. 2, to such draining member 18 attached to a rear bracket 4 of the starter motor, the tubular body 18b of the draining member 18 is easily bent at the thin-wall portion 18c, thereby preventing the water from coming from the leading edge of the tubular body into the inside of the starter.

FIGS. 3a and 3b drawings showing another embodiment wherein the draining member 18 has a blade 18e integrally formed at its leading portion. In this embodiment, the blade 18e is formed on the peripheral surfaces of the tubular body 18b in its longitudinal direction. The second embodiment is the same as the first embodiment except for the provision of the blade 18e. In the draining member 18 of the second embodiment, when the draining member receives splashed water or the like, the draining member can be more easily bent because the provision of the blade 18e enlarges the area for receiving water pressure, in addition to the provision of the thin-wall portion 18c. As a result, the prevention against water invasion from the draining member 18 can be further improved. Although only one blade 18e is shown to be provided on the tubular body 18b in its longitudinal direction in the second embodiment, the number of the blade is not limited to one. The blade can be formed in the circumferential direction of the tubular body 18b. The blade can be formed so as to be slanted with respect to the axis of the tubular body 18b. The arrangement of the blade can be chosen according to the direction in which the blade receives water pressure. The plural blades which are provided in different directions can be combined.

Although the tubular body is formed with the thin-wall portion 18c having a predetermined equal width in section in the first and the second embodiments, the thin-wall portion 18c can be constituted by a notch so that the tubular body can be bent at the notch. When the direction in which water pressure is applied can be predicted, the thin-wall portion having the predetermined equal width in section or the notch can be formed so that the tubular body can be bent in a predetermined direction.

Although the draining member 18 is attached to the rear bracket 4 to be used as a starter draining device in the first and the second embodiments, the draining member 18 can be attached to the casing of the starter through the yoke 2, the front bracket 11, the solenoid switch casing 14, or the like. These cases can also enjoy advantages similar to the first and the second embodiments.

Obviously, numerous modifications and variations of the present invention are possible in light of the above teachings. It is therefore to be understood that within the scope of the appended claims, the invention may be practiced otherwise than as specifically described herein.

What is claimed is:

1. A water draining device for a vehicle starter motor, comprising:
    a head portion (18a) adapted to be attached to a housing member of the starter motor,
    an elongate tubular body (18b) having an inner circumferential surface defining a labyrinth structure, made of an elastic material, and depending downwardly from the head portion; and
    deformation means embodied in the tubular body at an upper, root portion thereof proximate the head portion to render said root portion more deformable than portions of the tubular member at any other position, such that external splash water or the like impacting laterally against the tubular body causes the tubular body to bend at said root portion and thereby prevent the entry of such water into the housing member via the tubular body.

2. A draining device according to claim 1, wherein the deformation means is defined by a root portion wall thickness which is less than that of the other portions.

3. A draining device according to claim 1, wherein the deformation is defined by at least one notch.

4. A draining device according to claim 1, wherein the tubular body has an outstanding water impact blade on a peripheral surface adjacent a lowermost edge.

5. A draining device according to claim 2, wherein the tubular body has an outstanding water impact blade on a peripheral surface adjacent a lowermost edge.

6. A draining device according to claim 3, wherein the tubular body has an outstanding water impact blade on a peripheral surface adjacent a lowermost edge.

* * * * *